July 9, 1935.  L. H. KITTREDGE  2,007,896
STORAGE BATTERY
Filed May 15, 1933
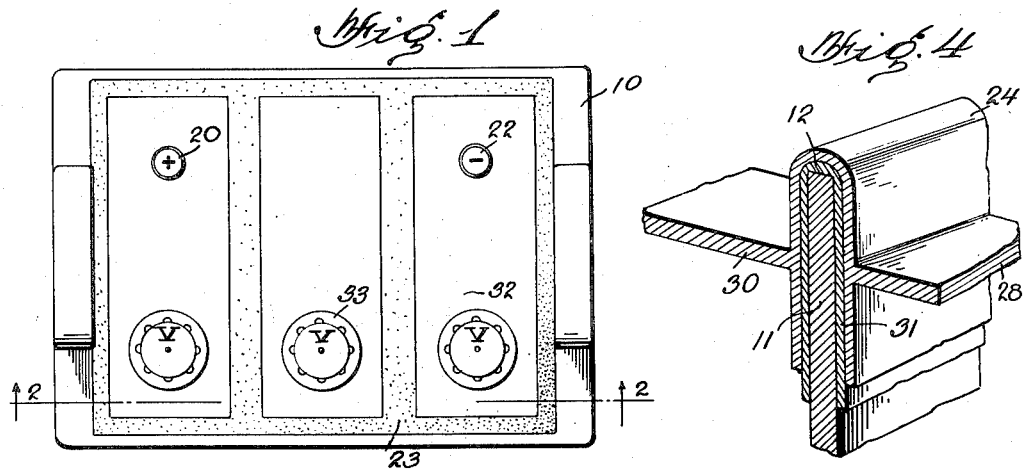
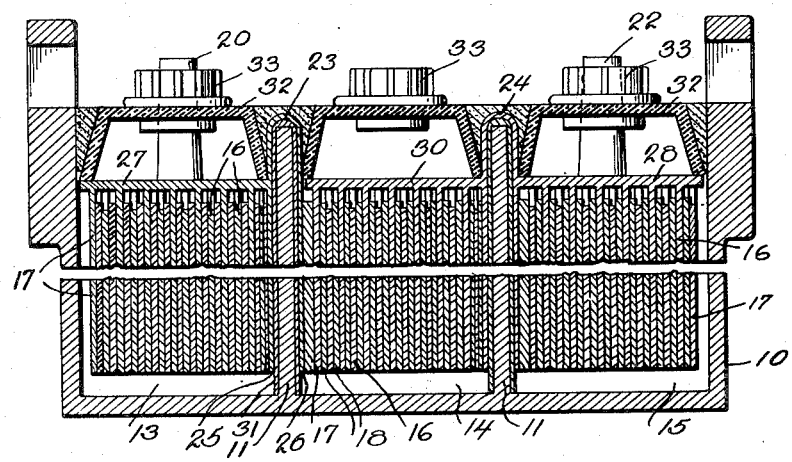
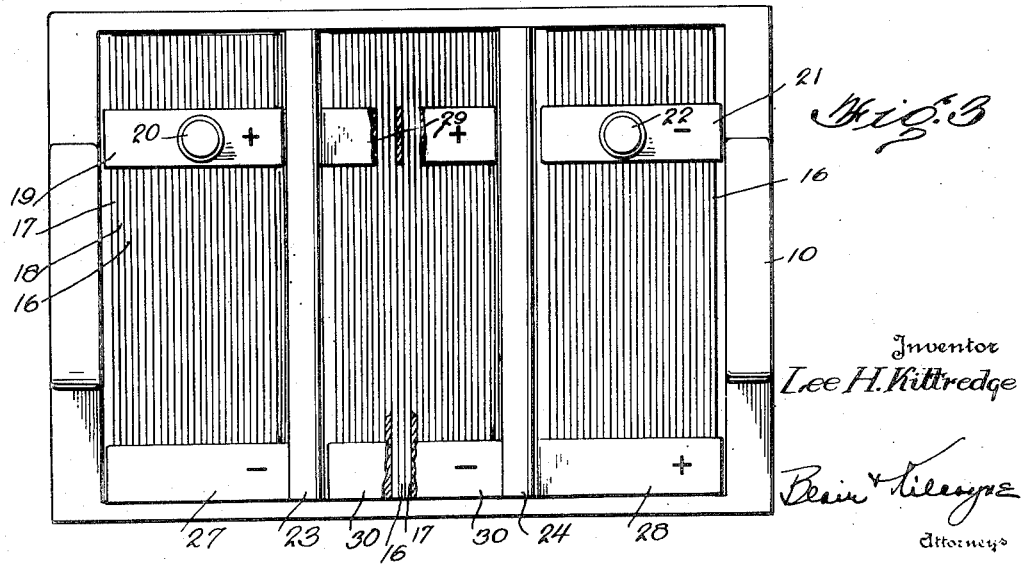
Inventor
Lee H. Kittredge
Attorneys Patented July 9, 1935

2,007,896

UNITED STATES PATENT OFFICE 2,007,896

STORAGE BATTERY

Lee H. Kittredge, Superior, Wis.

Application May 15, 1933, Serial No. 671,245

2 Claims. (Cl. 136—134)

This invention relates to improvements in storage batteries, particularly of the portable type, adapted for use in automotive vehicles and the like where batteries are subject to vibration, jolts, etc., and for other uses where the battery is required to deliver a heavy current.

An important feature of my invention is the simplifying of the construction of the inner cell connector plates and at the same time increasing the capacity of the battery for delivering heavier currents. This is accomplished by the cell connectors or plate connectors being arranged to serve as active plates as well as conductors from cell to cell. These connector plates cover the full side surface of the plate groups and are active plates in themselves so that the flow of current is diagonally from every part of the plate group surfaces thereby eliminating expansion of plate grids which is caused by lack of current carrying capacity in the usual type of storage battery.

Another feature of my invention is the forming of the connector element as an integral piece so that burning of intermediate connections outside of the battery is avoided thereby eliminating the possibility of poor connections. In a three cell storage battery four plate group connectors are burned to the two intermediate plate and connector elements thereby eliminating four post connectors and two strap top connectors.

A further feature of my invention resides in the prevention of seepage of electrolyte between cells in that the full surface of the battery case wall is covered with a sealing compound and the connector and plate element is pressed over the wall while the sealing compound is hot so that it will be held firmly in place thereby assuring the prevention of seepage because of the large surface which is sealed. The connector elements being plates themselves it is unnecessary to increase the size of the battery for the same number of plates per cell as in the usual storage batteries.

Another feature of the invention is the arrangement of the two post cable terminals at one side of the battery and the inspection openings and vent plugs on the opposite side thereof which is not only effective in eliminating corrosion at the terminals to a very great extent caused by said spray from vent plugs that are usually quite close to these posts but also saves breakage of the vents and covers which frequently occurs while working on the cable lug securing nuts and bolts.

Further features, objects and advantages will appear from the following description in connection with the accompanying drawing in which like characters of reference denote similar parts in the various figures.

In the drawing—

Fig. 1 is a top plan view of a storage battery in accordance with my invention;

Fig. 2 is a vertical sectional view taken on line 2—2 of Fig. 1;

Fig. 3 is a top plan view of my battery with cover members removed;

Fig. 4 is a fragmentary detail perspective view partly in section showing a connector between cells of the battery.

Referring to the drawing, a storage battery in accordance with this invention includes a case 10 shown with three cells provided by two intermediate walls 11, the top edges 12 of which may be slightly below the top of the outer walls of case 10. The case is thus divided into three cells 13, 14 and 15 arranged in series for a usual 6 volt battery, but the case may of course be formed with but two cells for a four volt battery or more than three cells for a higher voltage battery.

Each cell 13, 14 and 15 encases two plate groups, a positive group 16 and a negative group 17 with the individual plates of one group interposed between the plates of the other group in the same cell and spaced by separators 18 which are susceptible to the seepage of electrolyte and prevent contacting of the plates. As shown in Fig. 2 and in Fig. 3, plates of the positive group 16 in cell 13 are connected through a plate group connector 19 to a terminal post 20, and in cell 15 the plates of the negative group 17 are similarly connected through a plate connector 21 to a terminal post 22. As best seen in Fig. 1, these two terminal posts 20 and 22 are the only external connecting members of the battery and they are arranged at one side thereof.

In order to connect the other groups of plates, intermediate connecting members 23 and 24 comprising connectors designated by these numerals are provided which extend over the top edges 12 of the cell walls 11. Connecting member 23 extends as a negative plate 25 and a positive plate 26 in cells 13 and 14, respectively, and connecting member 24 provides similar negative and positive plates in cells 14 and 15, respectively. In cell 13 a plate connector 27 is burned to connecting member 23 and this connector 27 carries the negative group of plates 17; in cell 15 a plate connector 28 is similarly secured to connecting member 24 that carries the positive group of plates 16 in that cell. In the intermediate cell 14 plate connector 29 is secured to the positive plate 26 of connecting member 23 and carries the positive group of plates 16 while a plate connector 30 burned to connecting member 24 carries the negative group of plates 17.

In positioning connecting members 23 and 24 in the battery case 10 the intermediate walls 11 thereof are each previously covered with a hot sealing compound 31 and these connector plates are pressed over the same so that they are held firmly in place and prevent seepage of electrolyte between cells.

As shown these connector and plate members 23 and 24 are of substantially uniform thickness and substantially cover the entire intermediate walls 11 of the battery case. Over the plate groups and intermediate connecting members cover members 32 are positioned and the cells are further sealed by sealing compound around the edges of and between these cover members so that the battery cells are entirely encased with the exception of the terminal posts 20 and 22 as provided for by apertures in the corresponding cover members.

Each of the cover members 32 has an inspection and vent opening 33 in an end opposite from the end of the terminal posts so that they will be adjacent the opposite side of the battery from these terminal posts. These openings are closed in the usual manner by means of vented closure members but owing to their position remote from the terminal posts they are not in the way to be damaged by tools operating on nuts and bolts of terminal lugs and the corrosion of the battery terminals is eliminated to a very great extent.

I claim:

1. In a storage battery having a casing and dividing walls for forming a plurality of cells, a series of alternate positive and negative plates positioned in each cell, an element comprising a U-shaped sheet fitting over the top and sides of one of the walls and extending substantially the entire width of the cell, and a strap on each side of the U-shaped sheet rigidly connected thereto and connected to alternate plates of the cell in which it extends, said depending sides of the U-shaped sheets themselves forming one of the plates in the adjacent cells respectively.

2. In a storage battery having a casing and dividing walls for forming a plurality of cells, a series of alternate positive and negative plates positioned in each cell, an element comprising a U-shaped sheet fitting over the top and sides of one of the walls and extending substantially the entire width of the cell, a strap on each side of the U-shaped sheet rigidly connected thereto and connected to alternate plates of the cell in which it extends, said depending sides of the U-shaped sheets themselves forming one of the plates in the adjacent cells respectively, and a hardened compound between the faces of the walls and the adjacent faces of the sheets and in which said element is set.

LEE H. KITTREDGE.